United States Patent [19]

Homma

[11] Patent Number: 4,858,020
[45] Date of Patent: Aug. 15, 1989

[54] IMAGE SENSING DEVICE
[75] Inventor: Hideo Homma, Tokyo, Japan
[73] Assignee: Canon Kabushiki Kaisha, Tokyo, Japan
[21] Appl. No.: 148,688
[22] Filed: Jan. 26, 1988
[30] Foreign Application Priority Data Jan. 28, 1987 [JP] Japan .................................. 62-016211
Jan. 28, 1987 [JP] Japan .................................. 62-016212
Jan. 28, 1987 [JP] Japan .................................. 62-016213

[51] Int. Cl.$^4$ .............................................. H04N 3/14
[52] U.S. Cl. ................................ 358/287; 358/213.13; 358/213.26; 358/909
[58] Field of Search ............... 358/280, 287, 909, 180, 358/213.13, 213.26, 213.29, 165, 125, 126

[56] References Cited

U.S. PATENT DOCUMENTS

4,002,824 1/1977 Petrocelli et al. ............... 358/213.13
4,504,865 3/1985 Nishizawa et al. ................. 358/909
4,605,957 8/1986 Yamada .................... 358/287
4,712,142 12/1987 Tomita et al. ........................ 358/293
4,783,702 11/1988 Sone et al. ...................... 358/213.26
4,791,308 12/1988 Nagashima .......................... 250/578

Primary Examiner—Howard W. Britton
Assistant Examiner—Kim Yen Vu
Attorney, Agent, or Firm—Fitzpatrick, Cella, Harper & Scinto

[57] ABSTRACT

An image sensing device allowing normal or teleconversion operation has an image sensor which includes a plurality of horizontal lines and is capable of being non-destructively read out. Area setting ciruitry is included for variably setting a reading area of the image sensor. Clock control circuitry includes a plurality of reading lines and is arranged to read out image information from the selected reading area. Reading circuitry non-destructively reads out, a plurality of times for the tele-conversion operation, the signals from the set reading area. The reading cycle corresponds to the size of the set reading area. Clearing circuitry is also included for clearing altogether the areas of the image sensor other than the set reading area.

27 Claims, 7 Drawing Sheets

IMAGE SENSING DEVICE

BACKGROUND OF THE INVENTION

1. Field of the Invention

This invention relates to a solid state image sensing device having a tele-converting function.

2. Description of the Related Art

To impart a tele-converting function to a solid state image sensing device, it has been practiced to employ optical means called a tele-converter lens.

The use of tele-converter lens, however, has caused the size of a the whole device to increase as much as the size of the tele-converter lens.

Meanwhile, it has been contrived to read out the middle part of the image sensing plane of the device by enlarging that part. In accordance with this method, however, an adverse effect such as blooming or the like takes place as the parts of the image sensing plane other than the enlarged part are also exposed to light. This drawback has prevented the adoption of this method.

SUMMARY OF THE INVENTION

It is therefore an object of this invention to provide a solid state image sensing device having a tele-converting function which is arranged to be capable of adequately reading sensed image information from the middle area of an image sensor surface.

It is another object of the invention to provide a solid state image sensing device which is capable of adequately reading out sensed image information from a desired area of the image sensor surface.

To attain this object, a solid state image sensing device which is provided with a solid state image sensor capable of non-destructive readout and is arranged according to this invention as an embodiment thereof comprises: area setting means for setting an enlarged reading area of a given size on the surface of the image sensor; clock control means for controlling a clock signal which is provided for setting a reading cycle; and clearing means for clearing all the areas other than the enlarged readout area on the image sensor surface.

Therefore, in reading sensed image information from the middle part of the solid state image sensor surface, the reading clock signal is set at an apposite frequency; and the areas other than the enlarged reading area are cleared. The embodiment is thus capable of performing a function which is equivalent to the function of an optical tele-converter.

Further, to attain the above stated object, another solid state image sensing device having a solid state image sensor capable of performing non-destructive readout is arranged as another embodiment of this invention to comprise: area setting means for setting a reading area on the surface of the image sensor; initializing means arranged to clear all the areas other than the reading area on the image sensor surface; and output means which is arranged to read out sensed image information from the reading area in a cycle corresponding to the size of the reading area and to form a composite output signal from signals of a plurality of rows.

In setting a desired reading area on the surface of the solid state image sensor, reading cycles in the horizontal and vertical directions are also suitably determined. With the areas other than the reading area cleared in addition to the setting action, the arrangement of the invention provides not only an electronic zooming function having accurate magnification reproducibility but also an electronic panning function.

Other objects and features of this invention will become apparent from the following detailed description of embodiments thereof taken in connection with the accompanying drawings.

DETAILED DESCRIPTION OF THE PREFERRED EMBODIMENTS

Figure 1:
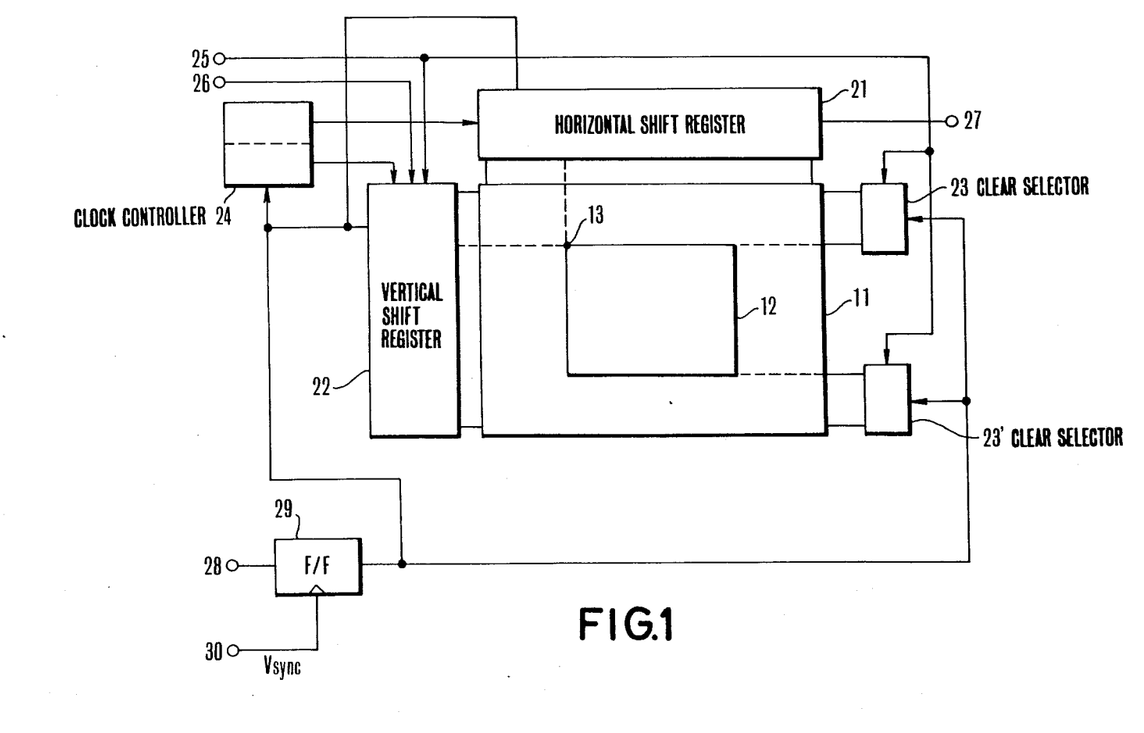
FIG. 1 is a block diagram showing a first embodiment of this invention.
Figure 2:
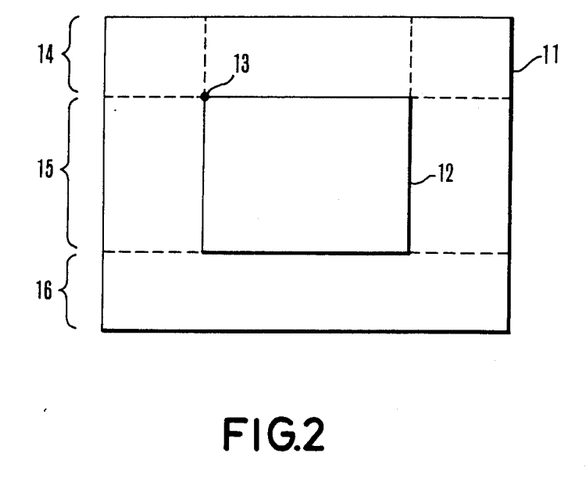
FIG. 2 is an enlarged view showing an image sensing plane.

The present invention is described in detail through the following description of embodiments thereof:

FIG. 1 is a block diagram showing a first embodiment of this invention. FIG. 2 shows in an enlarged view the surface of an image sensor. These illustrations include an image sensing plane 11; an actual image sensing plane 12 obtained for a tele-conversion photo (enlarged readout); a readout start point 13 of the tele-conversion photo taking; horizontal line parts 14, 15 and 16 of which the horizontal line parts 14 and 16 are not necessary for tele-conversion photo taking; a horizontal shift register 21; a vertical shift register 22; clear selectors 23 and 23'; a clock controller 24; a clear pulse input terminal 25; a read pulse input terminal 26; a video output terminal 27; a tele-converter selection signal input terminal 28; a D type flip-flop 29; and an input terminal 30 for a vertical synchronizing signal Vsync.

This embodiment operates as follows:

In an ordinary photo taking mode: Reading begins from the upper left end of the image sensing plane 11. The clear selectors 23 and 23' remain inoperative. The solid image sensor employed in this embodiment is of a non-destructive readout type which is known, for example, from Japanese Patent Application Laid-Open SHO No. 60-12764, etc. Therefore, every horizontal line selected by the vertical shift register 22 is cleared in every row all at once after it has been read out. The clearing action is performed with a clear pulse supplied from the clear pulse input terminal 25.

In a tele-conversion photo taking mode: This mode is set by a tele-conversion selection signal which is suppied to the input terminal 28. Upon receipt of this signal, a sensed image is read out beginning with a point 13 within the image sensing plane 11. The coordinates of this reading start point 13 are determined jointly by the horizontal shift register 21 and the vertical shift register 22. In this case, the frequency of the clock signals to the horizontal and vertical shift registers 21 and 22 are controlled by the clock controller 24. For example, the clock frequency is set at a value which is ½ of the ordinary mode frequency in the case of two magnifications and ⅓ of the ordinary mode frequency in the event of three magnifications.

Therefore, one and the same horizontal line is recurrently read out a number of times corresponding to the enlarging magnifying rate of the tele-conversion. In the case of two magnifications, for example, one and the same horizontal line is continuously read out twice. After that, the line is cleared. Then, the vertical shift register 22 has access to a next horizontal line.

In the tele-conversion mode, the clear selectors 23 and 23' are operated to clear the horizontal line parts 14 and 16 during a horizontal or vertical blanking period. All the horizontal lines within the parts 14 and 16 are concurrently cleared. Whereas, the horizontal line part 15 is line-sequentially cleared. The clearing action by the clear selectors 23 and 23' may be performed either during a vertical blanking period or during a horizontal blanking period. However, an arrangement to perform the clearing action during every horizontal blanking period gives a better blooming resisting characteristic. The whole image sensing plane thus can be cleared even in the case of the tele-conversion mode.

Change-over between the ordinary photo taking mode and the tele-conversion mode is arranged to be done by the D type flip-flop 29 in synchronism with the vertical synchronizing signal Vsync. This arrangement effectively prevents a transient image deterioration.

In the case of the embodiment described above, the clear selectors 23 and 23' are used in clearing the whole image sensing plane. However, it is possible to have the function of the clear selectors 23 and 23' arranged to be carried out by a single vertical shift register. In that event, the vertical shift register 22 is arranged to function as shown in FIGS. 3 and 4.

Figure 3:
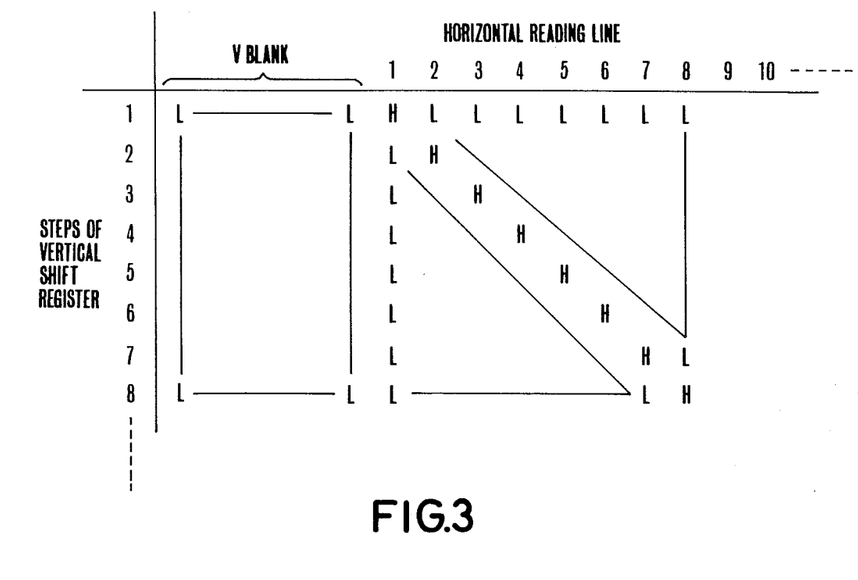
FIGS. 3 and 4 show an arrangement for imparting a clearing function to shift registers in addition to their functions.
Figure 4:
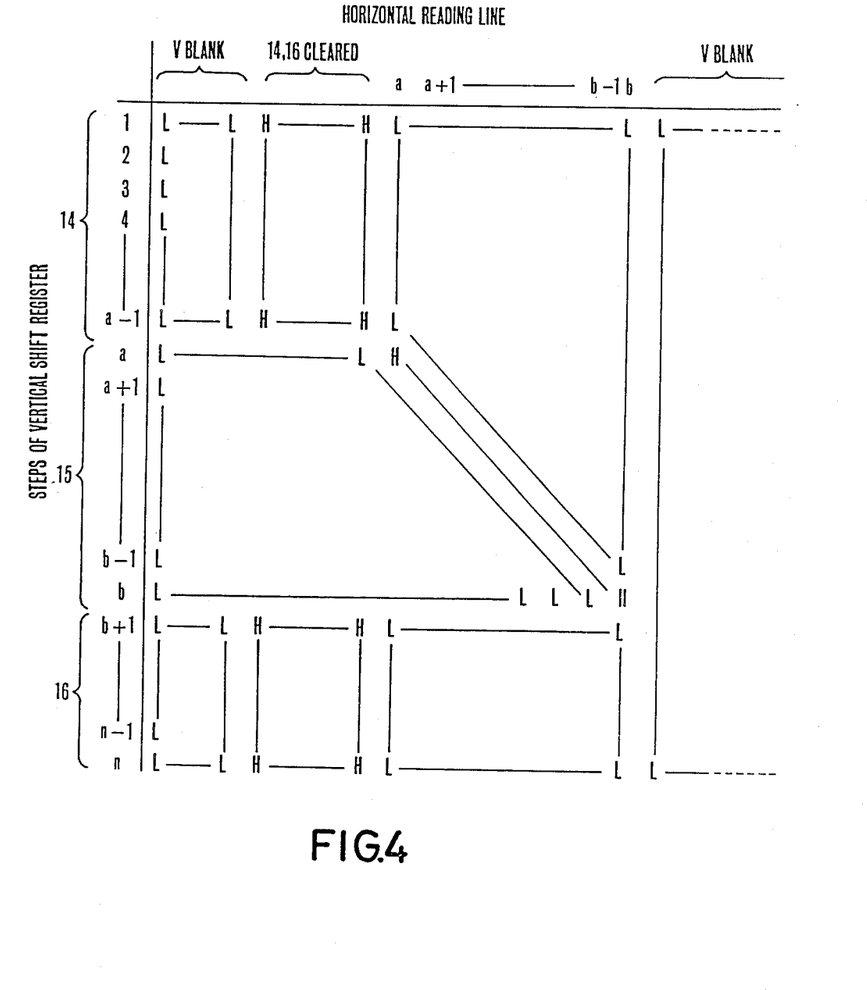

FIG. 3 shows the operation of the vertical shift register 22 to be performed in the ordinary photo taking mode. In FIG. 3, a reference symbol H denotes horizontal lines to which the vertical shift register 22 is arranged to have access, and reference symbol L denotes horizontal lines to which the vertical shift register 22 does not have access. FIG. 4 shows the operation of the vertical shift register 22 in the tele-conversion mode. In this instance, the unnecessary parts of the image plane are cleared during the vertical blanking period. For that purpose, the steps 1 to a-1 and steps b+1 to n of the vertical shift register 22 are controlled to be at a high level H (to have access). In other words, these steps 1 to a-1 and b+1 to n correspond to the horizontal line parts 14 and 16 of FIG. 2. The shift register operates in the same manner as in the ordinary photo taking mode at steps a to b. Meanwhile, the clock controller 24 controls the clock frequency for the vertical shift register 22 to be 1/(magnifying rate) of the clock frequency of the ordinary photo taking mode. In controlling the operation of the vertical shift register 22 as shown in FIG. 4, the unnecessary parts of the image sensing plane are thus cleared during every vertical blanking period.

In the first embodiment described above, the frequency of the reading clock signal is set at an opposite value for reading sensed image information from the middle part of the surface of the solid state image sensor while the areas of the image sensor surface other than the reading area are cleared. This arrangement not only permits a tele-conversion photo taking operation on the middle part of the image plane but also a clearing action on the unnecessary areas of the image sensing plane, so that the blooming resistance characteristic of the image sensing device can be improved.

Further, the embodiment prevents transient deterioration of the image as the magnifying rate can be changed from one rate over to another in synchronism with the vertical synchronizing (sync, for short) signal.

Figure 5:
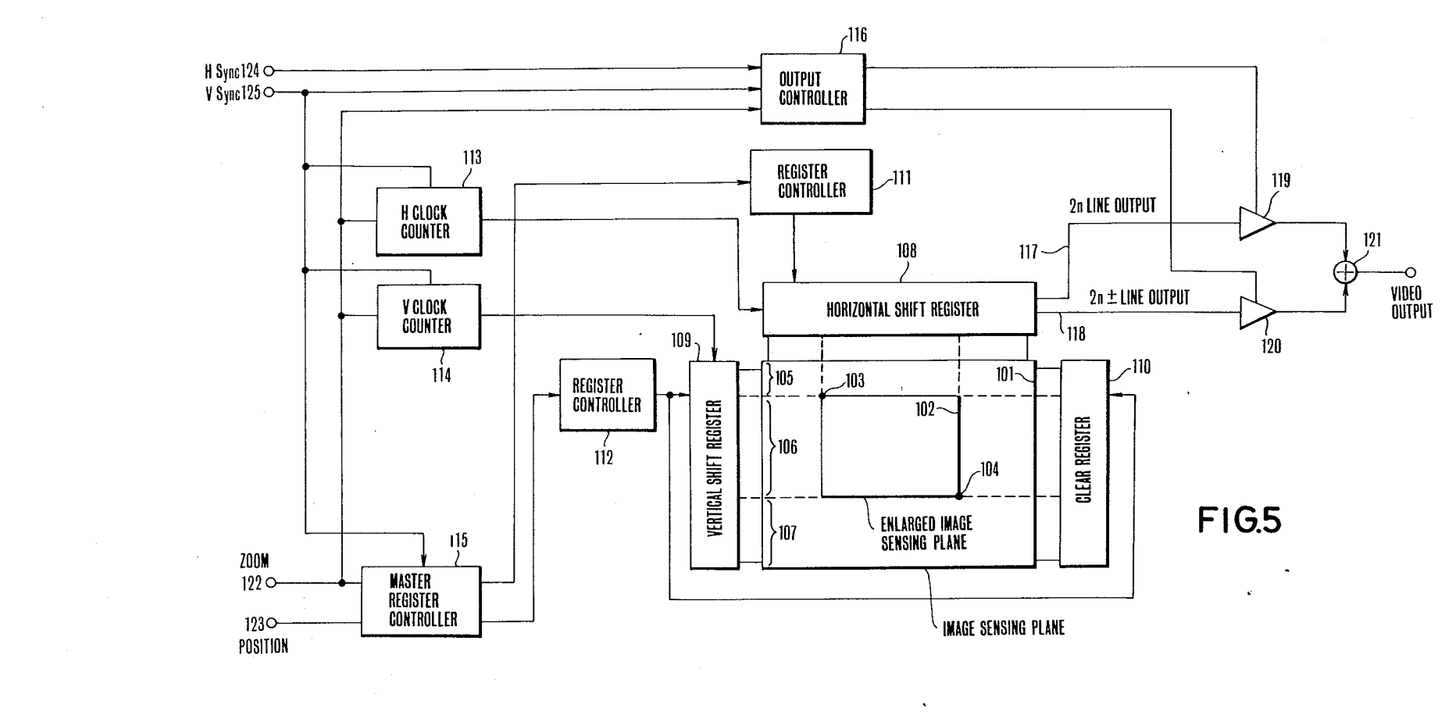
FIG. 5 is a block diagram showing a second embodiment of this invention.

A second embodiment of this invention is arranged as follows: FIG. 5 shows a solid state image sensing device arranged as the second embodiment which is an improvement over a device arranged to be capable of performing non-destructive readout in the manner as disclosed, for example, in Japanese Patent Application Laid-Open SHO No. 60-12764 cited in the foregoing. In FIG. 5, the illustration includes an image sensing plane 101; an enlarged image sensing plane 102 which is to be used for an electronic zooming action; a reading start point 103 for zooming; the end point 104 of the zooming action; horizontal line parts 105 and 107 which are unnecessary in the event of zooming; a horizontal shift register 108 which is arranged to transfer the image information carried by each horizontal line; a vertical shift register 109 which is arranged to select a reading line and a clearing line (determined in synchronism with the reading line); a clear register 110 which is arranged to select, in conjunction with the vertical shift register 109, the unnecessary horizontal line parts 105 and 107 to be cleared during the zooming action; register controllers 111 and 112 which are arranged to set the reading start and end points of the horizontal and vertical shift registers 108 and 109; clock controllers 113 and 114 which are arranged to control the frequency of the clock signals to be supplied to the horizontal and vertical shift registers 108 and 109 during the zooming action; a master register controller 115 which is arranged to control the register controllers 111 and 112 for the purpose of adequately maintaining the center position and the aspect ratio of the image plane; an output controller 116 which is arranged, as will be described in detail later on, to correlate horizontal line information on the horizontal lines of the image sensing plane to the display scanning lines of a display device (not shown) during the zooming action; the output signal 117 of an even number horizontal line; the output signal 118 of an odd number horizontal line; variable gain amplifiers 119 and 120 which are arranged to have the line output signals 117 and 118 introduced thereto respectively; an adder 121 which is arranged to obtain a video output signal by adding together the outputs of the variable gain amplifiers 119 and 120; a zoom control input terminal 122; a position control terminal 123 which is arranged to control a zooming position within the image sensing plane; an input terminal 124 for the horizontal sync signal Hsync; and an input terminal 125 for the vertical sync signal Vsync. The second embodiment operates as follows:

In an ordinary operation mode (a non-zooming mode): The register controllers 111, 112 and 115 set the reading start point at the left upper end of the image sensing plane and the reading end point at the lower right end of the image sensing plane. Therefore, information is read out from the whole image sensing plane 101. The clear register 110 remains inoperative. The vertical shift register 109 selects clearing lines one after another from the upper part in synchronism with lines read out. This clearing action is performed for every horizontal line, independently of the action of the horizontal shift register 108.

In selecting reading lines, the vertical shift register 109 simultaneously selects two lines adjacently located in upper and lower positions. The gain of each of the variable gain amplifiers 119 and 120 is changed from one value over to another for every horizontal scanning line by the output controller 116.

In the case of zooming, i.e., enlarged reading, control signals are supplied from the input terminals 122 and 123. The controllers 111 and 112 determine the reading start point 103 and reading end point 104. Then, the master register controller 115 controls the aspect ratio of the image to keep it at an adequate value in such a way as to prevent deviation of the center of the image to be read out irrespectively of any changes in the zooming ratio and in the position of the reading area.

During this zooming action, the clear register 110 selects the horizontal line parts 105 and 107 and has access thereto. In other words, in this instance, the selection range of the vertical shift register 109 and that of the clear register 110 are complementary to each other. However, while the vertical shift register 109 selects lines in a line sequential manner, the clear register 110 gains access simultaneously to all the horizontal lines.

The horizontal clock controller 113 controls the shift clock frequency of the horizontal shift register in such a way as to have it at a value of 1/A with the magnifying rate assumed to be A. The vertical clock controller 114 operates differently from the horizontal clock controller 113, because when the magnifying rate obtained by zooming becomes a non-integral value, the scanning lines of the display and the horizontal lines of the image sensing plane no longer correlate in the ratio of 1 to 1. The vertical shift register 109 then must be matched with this. Assuming that the integer part of a real number X is expressed as I(X), the number of effective scanning lines of the display is 490 and the number of the horizontal lines of the horizontal line part 106 is L, the vertical clock controller 114 controls the clock pulses in such a way as to have the vertical shift register 109 gain access from the upper end of the horizontal line part 106 to a line located in a position of I(m X L/490) and another line located in a position of I(m X L/490)±1. In other words, a clock pulse is sent out when there obtains a relation of I(m X L/490)-I((m-1) X L/490)=1 and then the vertical shift register 109 proceeds by one step.

The image sensing plane has the whole range 101 thereof optically exposed to light even during the process of zooming. If no provision were made for this circumstance, this would bring about an adverse effect such as blooming, etc. To prevent such adverse effect, it is always necessary to clear the whole image plane. To meet this requirement, at the horizontal line part 106, one or two lines are cleared concurrently with the above stated selection of a reading line. Meanwhile, horizontal line parts 105 and 107 are selected by the clear register 110 and are cleared all at once either during a horizontal blanking period or a vertical blanking period. However, in respect to prevention of blooming, clearing by the clear register 110 is preferably performed in a cycle of the H period during the horizontal blanking period. The center of the image is arranged to be controlled by a signal from the position control terminal 123 during the process of zooming. This arrangement permits electrical panning.

The horizontal shift register 108 is arranged, as mentioned in the foregoing, to simultaneously produce sensed image information for two adjacent upper and lower lines. This information must be handled in correlation to the scanning lines of the display device.

Figure 6:
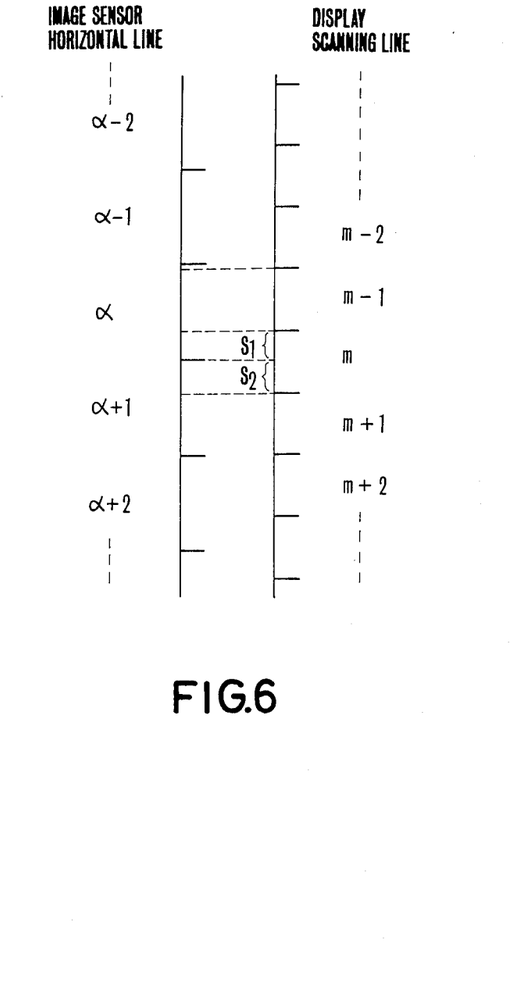
FIG. 6 shows a correlation obtained on a display between scanning lines and the horizontal lines of an image sensor during a zooming process.

FIG. 6 shows the display scanning lines obtained in the zooming mode. As shown, the information is included in a horizontal line $\alpha$ of the image sensor when a display scanning line m-1 is obtained on the display. In that case, therefore, the information of the line $\alpha$ is displayed as it is. However, for a next scanning line m, the information straddles lines $\alpha$ and $\alpha+1$. In this case, information obtained by weighted addition in the ratio of $\alpha:\alpha+1=S1:S2(S1+S2=1)$ is displayed as the information of the scanning line m. As mentioned in the foregoing, with the horizontal line $\alpha$ assumed to be $\alpha=I(m \times L/490)$, for the display on the display scanning line m, the vertical shift register 109 gains access to the lines $\alpha$ and $\alpha+1$. and performs control to have the gains of the variable gain amplifiers 119 and 120 be in the ratio of S1:S2. This gain designation for the variable amplifiers 119 and 120 can be done by providing, within the output controller 116, a ROM table mapped with the count value of a horizontal sync counter (not shown) and the magnifying rate of zooming.

The varied kinds of controllers 113 to 116 are arranged in such a way as to have the zooming ratio and the reading position set for every field (in synchronism with the vertical sync signal Vsync) like in the case of the first embodiment.

Figure 7A:
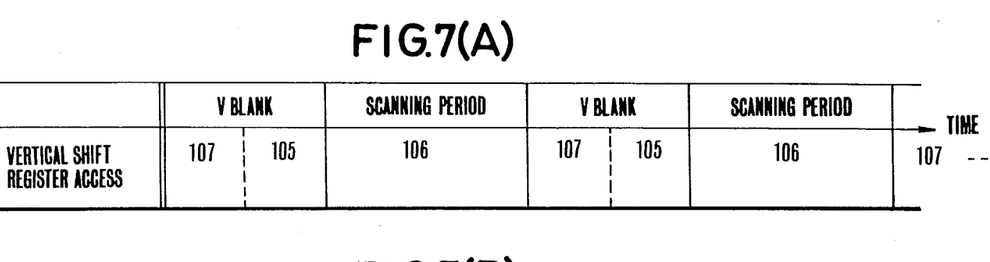
FIGS. 7(A) and 7(B) show an arrangement for giving a clear-register function to a vertical shift register.
Figure 7B:
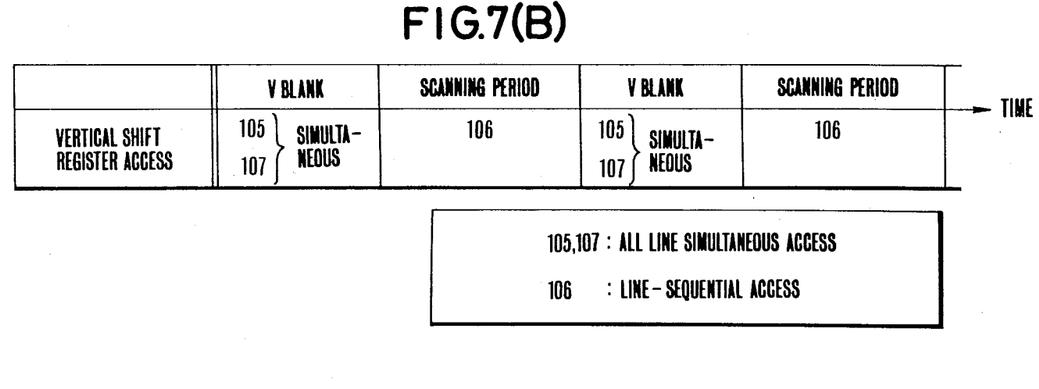

Further, in the embodiments described, the vertical shift register 109 and the clear register 110 are discretely arranged. However, since their selection ranges are complementary to each other, their functions may be arranged to be accomplished by a single vertical register. In the case of this modification, the function of the vertical register is as shown in FIGS. 7(A) and 7(B). FIG. 7(A) shows a mode in which the register gains access to the horizontal line parts 105 and 107 in a time sharing manner during vertical blanking periods. FIG. 7(B) shows another mode in which the register gains access simultaneously to these horizontal line parts 105 and 107. It must be noted that while access is simultaneously gained to all the horizontal lines within the horizontal line parts 105 and 107, access to the lines within the horizontal line part 106 is gained in a line-sequential manner.

As described in the foregoing, in the embodiments, the reading cycles in the horizontal and vertical directions are adequately determined in setting a desired reading area on the solid state image sensor surface. Besides, the areas other than the reading area are arranged to be cleared. This arrangement enables the sensed image information to be read out in an adequate state from the desired area of the image sensor surface.

In addition to the above stated advantage, the second embodiment has the following advantages:

(i) The use of the shift registers and the register controllers for the start and end of reading from a desired position of the image sensing plane in combination with the clock controllers corresponding to them enables the embodiment to electrically perform zooming and panning functions without having recourse to use of optical means.

(ii) The adverse effect of blooming or the like can be mitigated by means of the vertical shift register and the clear register which are arranged to be capable of always clearing the whole image plane.

(iii) The transient deterioration of the image which tends to take place during the zooming and panning processes can be prevented by the arrangement to operate the register controller, the clock controller and the output controller in synchronism with the vertical synchronizing signal Vsync.

(iv) During zooming, the output signal is obtainable in correlation with the display scanning lines in real time by virtue of the weighted addition process performed on the signals of two adjacent horizontal lines.

What is claimed is:

1. An image sensing device comprising:
   an image sensor;
   area setting means for setting a reading area of said image sensor;
   clock control means for reading out sensed image information from said reading area, and for setting a reading cycle for performing said reading; and
   clearing means for clearing altogether the areas of said image sensor other than said reading area.

2. A device according to claim 1, wherein said clock control means is arranged to change a reading frequency according to a magnifying rate.

3. A device according to claim 1, wherein said clearing means is arranged to clear said areas during a blanking period.

4. A device according to claim 3, wherein said clearing means is arranged to clear said areas during a vertical blanking period.

5. A device according to claim 3, wherein said clearing means is arranged to clear said areas during a horizontal blanking period.

6. A device according to claim 1, wherein said clock control means includes a plurality of reading lines for simultaneously reading out signals from a plurality of horizontal lines of said image sensor.

7. A device according to claim 6, further comprising gain control means for controlling the gain of the signal of each of said reading lines.

8. A device according to claim 7, wherein said gain control means is arranged to control the gain for each of said plurality of horizontal lines.

9. A device according to any one of claims 6 to 8, further comprising computing means for performing a computing operation on the signals of said plurality of horizontal lines.

10. A device according to claim 1, wherein said image sensor is capable of performing non-destructive readout.

11. A device according to claim 10, wherein said clock control means is arranged to read out a signal of said reading area a plurality of times.

12. An image reading device comprising:
    an image sensor having a plurality of horizontal lines;
    area setting means for setting a reading area of said image sensor;
    initializing means arranged to clear the areas of said image sensor other than said reading area; and
    output means for reading out sensed image information from said reading area in a reading cycle corresponding to the size of said reading area, and for composing an output signal from signals from said plurality of horizontal lines.

13. A device according to claim 12, wherein said initializing means is arranged to clear said areas during a blanking period.

14. A device according to claim 13, wherein said initializing means is arranged to clear said areas action during a vertical blanking period.

15. A device according to claim 13, wherein said initializing means is arranged to clear said areas during a horizontal blanking period.

16. A device according to claim 12, wherein said output means includes a plurality of reading lines which are arranged to permit simultaneous readout of signals of said plurality from horizontal lines of said image sensor.

17. A device according to claim 16, further comprising gain control means for controlling the gain of the signal of each of said reading lines.

18. A device according to claim 17, wherein said gain control means is arranged to control the gain for each of said plurality of horizontal lines.

19. A device according to any one of claims 16 to 18, wherein said output means includes computing means which is arranged to perform a computing operation on the signals of said horizontal lines.

20. A device according to claim 12, wherein said image sensor is capable of performing non-destructive readout.

21. A device according to claim 20, wherein said output means is arranged to read out a signal of said reading area a plurality of times.

22. An image sensing device comprising:
    (a) image sensing means capable of performing non-destructive readout;
    (b) setting means for variably setting a reading area of said image sensing means; and
    (c) reading means for non-destructively reading, a plurality of times, a signal of said reading area set by said setting means.

23. A device according to claim 22, wherein said reading means has a plurality of reading lines which are arranged to permit simultaneous reading of signals from a plurality of horizontal lines of said image sensing means.

24. A device according to claim 23, further comprising gain control means for controlling the gain of the signal of each of said plurality of horizontal lines.

25. A device according to claim 24, wherein said gain control means is arranged to control the gain for each of said plurality of horizontal lines.

26. A device according to one of claims 23 to 25, further comprising computing means for performing a computing operation on the signals of said plurality of horizontal lines.

27. A device according to claim 22, further comprising clearing means for clearing altogether areas of said image sensing means other than said reading area set by said setting means.

* * * * *

UNITED STATES PATENT AND TRADEMARK OFFICE
CERTIFICATE OF CORRECTION

PATENT NO. : 4,858,020

DATED : August 15, 1989

INVENTOR(S) : Hideo Homma

It is certified that error appears in the above-identified patent and that said Letters Patent is hereby corrected as shown below:

TITLE PAGE
[57]   ABSTRACT:

Line 4, change "ciruitry" to --circuitry--.

COLUMN 1:

Line 12, change "tele-converter lens," to --a tele-converting lens,--.

Line 13, delete "a".

COLUMN 4:

Line 2, change "(sync" to --(Vsync--.

COLUMN 5:

Line 39, change "I(mXL/490)±1" to --I(mXL/490)+1--.

Line 41, change "=1" to --=1,--.

UNITED STATES PATENT AND TRADEMARK OFFICE
CERTIFICATE OF CORRECTION

PATENT NO. : 4,858,020

DATED : August 15, 1989

INVENTOR(S) : Hideo Homma

It is certified that error appears in the above-identified patent and that said Letters Patent is hereby corrected as shown below:

COLUMN 8:

Line 7, delete "action".

Line 15, change "of said plurality from" to
        --from said plurality of--.

Line 26, change "said horizontal lines." to
        --said plurality of horizontal lines.--

Line 52, change "to one" to --to any one--.

Signed and Sealed this

Fourth Day of September, 1990

*Attest:*

HARRY F. MANBECK, JR.

*Attesting Officer*      *Commissioner of Patents and Trademarks*